(12) United States Patent
Weaver, III et al.

(10) Patent No.: US 7,123,700 B1
(45) Date of Patent: Oct. 17, 2006

(54) CONFIGURING USER INTERFACES OF CALL DEVICES

(75) Inventors: Samuel A. Weaver, III, Rowlett, TX (US); Gregory T. Osterhout, Coppell, TX (US); Julie R. Simons, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/560,019

(22) Filed: Apr. 27, 2000

(51) Int. Cl.
*H04M 1/64* (2006.01)

(52) U.S. Cl. .............................. 379/88.19; 379/88.13; 370/312; 709/217

(58) Field of Classification Search ............... 379/67.1, 379/79, 88.12, 88.13, 88.17, 88.18, 88.11, 379/88.19; 370/312, 328, 329, 335, 342, 370/351, 352, 356; 709/200, 217, 218, 219, 709/227; 395/200.34, 200.57
See application file for complete search history.

(56) References Cited

U.S. PATENT DOCUMENTS

| | | | | |
|---|---|---|---|---|
| 5,706,330 | A | 1/1998 | Bufferd et al. ................ 379/58 |
| 5,754,173 | A * | 5/1998 | Hiura et al. ................ 345/333 |
| 5,818,428 | A * | 10/1998 | Eisenbrandt ................ 345/173 |
| 5,872,922 | A * | 2/1999 | Hogan et al. ................ 709/204 |
| 6,009,469 | A * | 12/1999 | Mattaway et al. .......... 709/227 |
| 6,124,855 | A * | 9/2000 | Sells ......................... 345/333 |
| 6,175,854 | B1* | 1/2001 | Bretscher .................... 709/201 |
| 6,246,751 | B1* | 6/2001 | Bergl et al. ................ 379/67.1 |
| 6,295,284 | B1* | 9/2001 | Maggenti ................... 370/328 |
| 6,434,143 | B1* | 8/2002 | Donovan .................... 370/356 |
| 6,442,696 | B1* | 8/2002 | Wray et al. ................. 713/201 |
| 6,445,695 | B1* | 9/2002 | Christie, IV ............... 370/352 |
| 6,446,127 | B1* | 9/2002 | Schuster et al. ........... 709/227 |
| 6,477,150 | B1* | 11/2002 | Maggenti et al. .......... 370/312 |
| 6,493,324 | B1* | 12/2002 | Truetken .................... 370/261 |
| 6,493,431 | B1* | 12/2002 | Troen-Krasnow et al. ....................... 379/88.12 |
| 6,577,622 | B1* | 6/2003 | Schuster et al. ........... 370/352 |
| 6,874,009 | B1* | 3/2005 | Tuli ............................ 709/203 |
| 6,937,699 | B1* | 8/2005 | Schuster et al. .......... 379/67.1 |
| 2002/0010768 | A1* | 1/2002 | Marks et al. ............... 709/223 |

FOREIGN PATENT DOCUMENTS

| | | | |
|---|---|---|---|
| EP | 1037143 | * | 9/2000 |
| GB | 2329812 | * | 3/1999 |

(Continued)

OTHER PUBLICATIONS

Steve Donovan, et al., *The SIP Info Method*, Internet Draft, pp. 1-7 (Jun. 1999).

(Continued)

*Primary Examiner*—Fan Tsang
*Assistant Examiner*—Md. S. Elahee
(74) *Attorney, Agent, or Firm*—Trop, Pruner & Hu, P.C.

(57) ABSTRACT

A communications system includes call devices that are capable of communicating over a packet-based data network. The packet-based data network may be according to an Internet Protocol (IP), for example. The call devices are capable of performing call communications, such as according to a Session Initiation Protocol (SIP) or an H.323 Recommendation. Each of the call devices includes a user interface that is customizable to one or multiple configurations depending on which user is using the call device. User identification information is communicated from the call device to a proxy or server that has access to a database. The identification information is used to locate configuration information associated with the user. The corresponding user configuration information is then retrieved from the database and communicated back to the call device to configure the call device user interface.

38 Claims, 6 Drawing Sheets

FOREIGN PATENT DOCUMENTS

| | | |
|---|---|---|
| WO | WO 91/07839 | 5/1991 |
| WO | WO 99/09658 | 2/1999 |

OTHER PUBLICATIONS

Steve Donovan, *The SIP Info Method*, Internet Draft, pp. 1-10 (Feb. 2000).

LGI Systems Inc., *A Definition of Data Warehousing*, pp. 1-2, printed from web site http://www.dwinfocenter.org, dated at least as early as Feb. 12, 2000.

Jon Crowcroft, *Comments About H.323 and SIP*, pp. 1-6, printed from web site http://www.cs.columbia.edu (Jan. 22, 1998).

*Comparison of H.323 and SIP*, pp. 1-5, printed from web site http://www.cs.columbia.edu, dated at least as early as Feb. 3, 2000.

Information Sciences Institute, *Internet Protocol, Darpa Internet Program Protocol Specification*, RFC 791, pp. 1-48 (Sep. 1981).

J. Postel, *User Datagram Protocol*, RFC 768, pp. 1-3 (Aug. 1980).

M. Handley, et al., *SDP: Session Description Protocol*, RFC 2327, pp. 1-39 (Apr. 1998).

H. Schulzrinne, et al., *RTP: A Transport Protocol for Real-Time Applications*, RFC 1889, pp.1-69 (Jan. 1996).

S. Deering, et al., *Internet Protocol, Version 6 (IPv6) Specification*, RFC 2460, pp. 1-36 (Dec. 1998).

M. Handley, et al., *SIP: Session Initiation Protocol*, RFC 2543, pp. 1-153 (Mar. 1999).

Adam Roach, *Event Notification in SIP*, Internet Draft, pp. 1-8 (Mar. 2000).

Scott Petrack, et al., *The Pint Service Protocol: Extensions to SIP and SDP for IP Access to Telephone Call Services*, Internet Draft, pp. 1-59 (Oct. 14, 1999).

Jiri Kuthan, *Sample Uses of SIP Info with Varying Reliability Needs*, Internet Draft, pp. 1-7 (Oct. 17, 1999).

Robert Sparks, et al., *SIP Telephony Service Examples with Call Flows*, Internet Draft, pp. 1-79 (Oct. 1999).

Pagurek et al., *Management Of Advanced Services in H.323 Internet Protocol Telephony*, Infocom 2000, Nineteenth Annual Joint Conference of the IEEE Computer and Communications Societies Proceedings, IEEE Tel Aviv, Israel, Mar. 2000, pp. 91-100.

Dalgic, et al., *True Number Portability And Advanced Call Screening In A SIP-Based IP Telephony System*, IEEE Communications Magazine, IEEE Service Center, Piscataway, NJ, Jul. 1999, pp. 96-101.

Wang H.J. et al., *A Signaling System Using Lightweight Call Sessions*, Infocom 2000, Nineteenth Annual Joint Conference of the IEEE Computer And Communications Societies Proceedings, IEEE Tel Aviv, Israel, Mar. 26-30, 2000, pp. 697-706.

\* cited by examiner

CONFIGURING USER INTERFACES OF CALL DEVICES

BACKGROUND

The invention relates to configuring user interfaces of call devices in a communications system.

Data networks are widely used to link various types of network elements, such as personal computers, servers, gateways, network telephones, and so forth. Data networks may include private networks (such as local area networks or wide area networks) and public networks (such as the Internet). Popular forms of communications between network elements across such data networks include electronic mail, file transfer, web browsing, and other exchanges of digital data.

With the increased capacity and reliability of data networks, voice communications (including telephone calls, video conferencing, and so forth) over data networks have become possible. Voice communications over data networks are unlike voice communications in a circuit-switched network, such as a public switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data sent over a data network typically shares network bandwidth with conventional non-voice data (e.g., data associated with electronic mail, file transfer, web access, and other traffic).

Various standards have been proposed for voice and multimedia communications over data networks. One such standard is the H.323 Recommendation from the International Telecommunications Union (ITU), which describes terminals, equipment, and services for multimedia communications over data networks.

Another standard for voice and multimedia communications is the Session Initiation Protocol (SIP), which establishes, maintains, and terminates multimedia sessions over a data network. SIP is part of a multimedia data and control architecture developed by the Internet Engineering Task Force (IETF). The IETF multimedia data and control architecture also includes other protocols to enable voice and multimedia sessions over data networks, including the Resource Reservation Protocol (RSVP) for reserving network resources; the Real-Time Transport Protocol (RTP) for transporting real-time data and providing quality of service (QoS) feedback; the Real-Time Streaming Protocol (RTSP) for controlling delivery of streaming media; the Session Announcement Protocol (SAP) for advertising multimedia sessions by multicast; and the Session Description Protocol (SDP) for describing multimedia sessions.

A call device in a communications network, such as a packet-based data network, may be configured to have a user interface that is specific for the user of the call device. Examples of call devices may include a network telephone, a computer, a portable device, and other types of devices. The user interface of a telephone may include pre-programmed buttons, such as speed dial buttons and other programmable buttons. Different users may have different preferences on which buttons are used for specific functions. The same also holds true for user interfaces of computer systems. For example, the graphical user interface (GUI) screen provided by a communications application program, such as a telephony application program, may be configured to a specific user's preferences.

If a second user wishes to use a call device configured to a first user's preferences, the second user may have to learn how the user interface is configured or avoid using certain functions all together. Shared devices, such as telephones in a conference room or a visitor's office, may need to be programmed with a generic user interface to avoid confusion. Such generic user interfaces on call devices may not provide a full feature set. For example, speed dial buttons may not be used since different users have different telephone numbers programmed into their speed dial buttons. In addition, buttons on a user interface may have to be specifically labeled to enable usage of those buttons for the desired functions.

A need thus exists for a method and apparatus to provide more convenient user interfaces in call devices that are capable of participating in communications sessions over a network.

SUMMARY

In general, according to one embodiment, an apparatus for use in a network includes a user interface providing one or more selectors for call control in call sessions over the network. An input receives identification information of a user, and a controller is adapted to provide configuration information corresponding to the user identification information to configure the user interface according to one of plural configurations.

Some embodiments of the invention may have one or more of the following advantages. Different users may use a common call device, with the user interface configured to the preference of the users that are using the call device. The user interface of the call device may thus be customizable to plural configurations, with one selected depending on the identified user. By providing a familiar user interface for each user, productivity is enhanced since the user does not have to waste time figuring out the user interface of the call device. In addition, the likelihood of full use of the available features of a call device is increased.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Session Initiation Protocol (SIP) in the described embodiments, further embodiments may include other protocols for establishing interactive call sessions over a data network.

Figure 1:
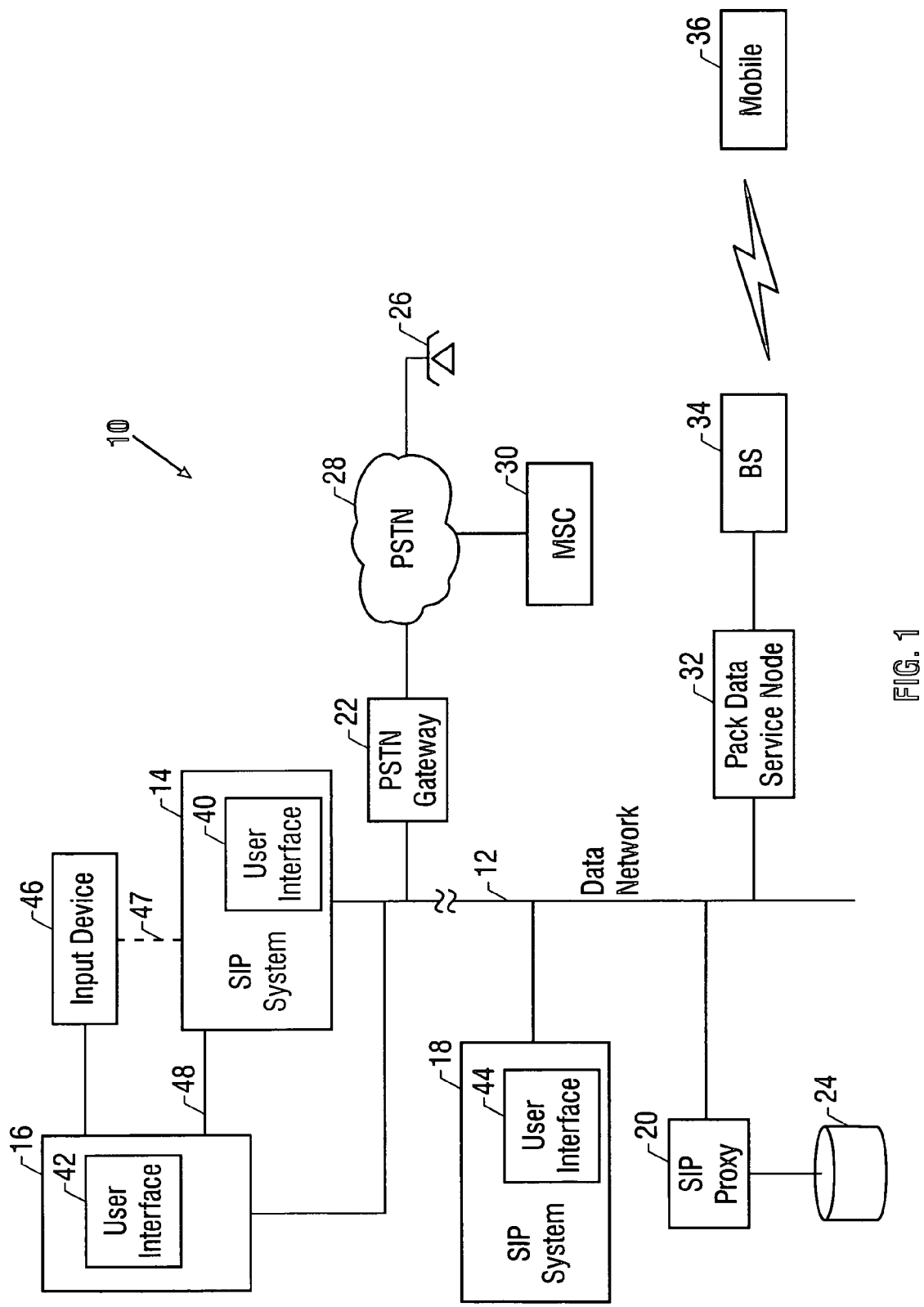
FIG. 1 is a block diagram of an embodiment of a communications system.

Referring to FIG. 1, a communications system 10 includes a packet-based data network 12 that may be coupled to various network elements 14, 16, 18, 20, and 22. The network elements may be capable of participating in real-time, interactive call sessions over the data network 12. As used here, a "data network" or "network" may refer to one or more communications networks, channels, links, or paths and systems or devices (such as routers), used to route data over such networks, channels, links or paths.

A "call session" refers generally to either an audio (e.g., voice) or a multimedia (e.g., audio and video) session established between two or more network elements coupled to the data network 12 (or any other packet-based data network). An "interactive" call session refers to a call session in which two or more parties are involved in an exchange of audio and/or video data in an established session between two or more network elements. A "real-time" interactive call session refers to an exchange of data, such as audio and/or video data, on a substantially real-time basis between two terminals. A session is substantially real-time if interaction is occurring between two end points or parties, with a communication from one end point followed relatively quickly by a response or another communication from the other end point, typically within seconds, for example.

Interactive call sessions are contrasted with electronic mail messaging, for example, in which a first participant sends a message over a data network to a second participant, with no acknowledgment indication usually provided back to the first participant that the second participant has received the message or that the second participant is even at his or her terminal. In contrast, an interactive session involves a request followed by some acknowledgment that a called party has answered the call request to enable the interactive session to be established in which participants exchange data (e.g., voice, video, and/or text).

One example of the packet-based data network 12 may be an Internet Protocol (IP) network, which is a packet-switched network. One version of IP is described in Request for Comments (RFC) 791, entitled "Internet Protocol," dated September 1981. Other versions of IP, such as IPv6 or other connectionless, packet-switched standards may also be utilized in further embodiments. A version of IPv6 is described in RFC 2460, entitled "Internet Protocol, Version 6 (IPv6) Specification," dated December 1998. Packet-switched data networks such as IP networks communicate with packets, datagrams, or other units of data over the data networks. Unlike circuit-switched networks, which provide a dedicated end-to-end connection or physical path for the duration of a call session, a packet-switched network is one in which the same path may be shared by several network elements. Packet-switched networks such as IP networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet.

The packet-based network 12 may also be connection-oriented, such as an ATM (Asynchronous Transfer Mode) network or a Frame Relay network. In a connection-oriented, packet-based network, a virtual circuit or connection is established between two end points. In such connection-oriented networks, packets are received in the same order in which they were transmitted.

The network elements 14, 18, 20 and 22 may be capable of exchanging messaging to establish a Session Initiation Protocol (SIP) call session. SIP is part of the multimedia data and control architecture from the Internet Engineering Task Force (IETF). A version of SIP is described in RFC 2543, entitled "SIP: Session Initiation Protocol," dated in 1999. SIP may be used to initiate call sessions as well as to invite members to a session that may have been advertised by some other mechanism, such as by electronic mail, news groups, web pages, and other mechanisms. The other protocols in the IETF multimedia and control architecture include the Resource Reservation Protocol (RSVP), as described in RFC 2205; the Real-Time Transport Protocol (RTP), as described in RFC 1889; the Real-Time Streaming Protocol (RTSP), as described in RFC 2326; the Session Description Protocol (SDP), as described in RFC 2327; and the Session Announcement Protocol (SAP).

Other standards may also be employed in further embodiments for controlling call sessions over the data network 12. Such other standards may be any other standard that provides for interactive, real-time audio or multimedia communications over the data network 12. One alternate standard is the H.323 Recommendation from the International Telecommunications Union (ITU).

As shown in FIG. 1, the network elements 14 and 18 are referred to as SIP systems, which may be SIP clients or SIP servers. A SIP client system includes a client application program that is capable of sending SIP requests to perform call requests. A SIP server system includes an application program that accepts SIP requests to service calls and to send back responses to SIP requests. Thus, the systems 14 and 18 may be SIP clients when originating requests and SIP servers when accepting or responding to requests. The network element 20 may be a SIP proxy system, which may include an intermediary program that acts as both a server and a client for making requests on behalf of other clients. Thus, for example, the SIP system 14 may make a call request to the SIP system 18 directly through the data network 12 (referred to as a peer-to-peer call session). Alternatively, the SIP client system 14 may go through the SIP proxy system 20 to make the call to the SIP system 18.

The communications system 10 also includes a PSTN gateway 22 that provides a gateway between the data network 12 and a public switched telephone network (PSTN) 28, which is coupled to circuit-switched telephone systems 26. The PSTN 28 may also be coupled to a mobile switching center (MSC) 30 that controls communications in a circuit-switched cellular network. The PSTN gateway 22 may include elements to enable it to participate in SIP call sessions (or H.323 call sessions) over the data network 12. A caller at a telephone system 26 (or at a mobile unit coupled through the MSC 30) may place a circuit-switched call through the PSTN 28 to the PSTN gateway 22. The PSTN gateway 22 then converts the call into a SIP call request (or H.323 call request) that is sent to one of the systems 14 and 18 (or system 20) to establish a call session between the telephone system 24 and the target system. The reverse process may also be performed in which a SIP system (or H.323 system) initiates a call through the PSTN gateway 22 to one of the telephone systems 26 or to a mobile unit through the MSC 30.

Another network element that may be coupled to the data network 12 is a packet data service node 32 to provide an interface to a packet-based cellular network, which includes plural base stations 34 and mobile units 36. The mobile units 36 are capable of communicating packet-based data through the packet data service node 32 to the data network 12. In one embodiment, the data traffic service node 32 may include a serving GPRS support node (SGSN) and a gateway GPRS support node (GGSN) 36 according to the General Packet Radio Service (GPRS) Protocol. Control and traffic signaling between the mobile units 36 and the packet data service node 32 may be according to one of the GPRS, Enhanced GPRS (EGPRS), and EGPRS Compact protocols.

The packet data service node 32 may also include elements to enable it to participate in SIP-based (or H.323 based) communications over the data network 12. Thus, call requests initiated by mobile units 36 are transformed into SIP requests (or H.323 requests) that are generated over the data network 12. Conversely, SIP requests (or H.323 requests) received by the packet data service node 32 may be converted into appropriate signaling that are sent to one or more mobile units 36 to establish a call session.

In the example communications system 10 of FIG. 1, the SIP system 14 may also be coupled to a network telephone 16. One example of the network telephone is the Etherset telephone from Nortel Networks Corporation. The SIP system 14 may be responsible for establishing a SIP call session on behalf of the network telephone 16 (initiating call requests on behalf of the network telephone 16 as well as accepting call requests from other network elements). Once a call session is established by the SIP system 14, a real-time stream is provided between the remote network element and the network telephone 16 over the data network 12. In effect, the SIP system 14 provides call control on behalf of the network telephone 16, while voice and other audio data are communicated directly between the network telephone 16 and the remote network element. The SIP system 14 itself also may be capable of voice communications (including voice and other audio processing components such as a speaker, headset, and microphone).

Each of the systems 14, 16, and 18 (which may also be referred to as call devices) provide a call control user interface 40, 42, and 44, respectively. As used here, a "call control user interface" refers to an interface from which a user can initiate or receive a call over a network. A call control user interface may include one or more selectors, e.g., buttons or selectable icons or other elements in a graphical user interface of a display that are useable to establish (initiate or accept) a call session over a network. The call control user interface may also include status indicators to indicate the status of a call session and other information associated with the call session.

In accordance with some embodiments, each of the call control user interfaces 40, 42 and 44 may be customizable to plural configurations according to a user who is currently using the particular system. Thus, for example, the network telephone 16 may be capable of being used by multiple users. Each user may have their own preferences for the user interface 42. Thus, when a user identifies himself or herself to the network telephone 16, such as by entering a user name or code or by using an input device 46 such as a biometric device, the network telephone 16 may generate a message transmitted to the SIP system 14 that contains the identification information of the user. A link 48 may actually be part of the data network 12, but is shown separately for illustrative purposes. Alternatively, the link 48 may be separate from the data network 12 and connected between corresponding ports of the network telephone 16 and the SIP system 14. In accordance with one embodiment, the link 48 between the telephone 16 and the system 14 may be the same as or similar to links discussed in U.S. patent application Ser. No. 09/307,356, entitled "Telephony and Data Network Services at a Telephone," filed on May 7, 1999, which is hereby incorporated by reference.

Upon receipt of the identification information, the SIP system 14 may send messages used for registration purposes to the SIP proxy system 20, which has access to a storage device 24 containing a database of registered users. The database in the storage device 24 may store the preferences of registered users. Such preferences may be communicated back to the SIP system 40 as configuration information, which in turn communicates the configuration information to the network telephone 16 over the link 48. Upon receipt of the configuration information, the network telephone 16 can configure its user interface 42 accordingly. Alternatively, instead of accessing the configuration information over the data network 12, the SIP system 14 may access an internally stored file that contains a portion or all of the configuration information in the database 24. The internal file may contain call control user interface configuration information associated with the most frequent users, for example.

The call control user interfaces 40 and 44 of the SIP systems 14 and 18, respectively, may also be similarly configured according to the user. The SIP system 14 or 18 is capable of identifying its user (such as through a connection 47 to the input device 46) and sending registration messages over the data network 12 to the SIP proxy system 20 to obtain configuration information from the database in the storage device 24. Configuration information is then retrieved from the database 24 and returned to the SIP system 14 or 18 to re-configure the user interface 40 or 44, respectively. Alternatively, the SIP system 14 or 18 may store part or all of the configuration information internally.

The storage device 24 may be part of the SIP proxy system 20 or it may be located separately from the SIP proxy system 20. The storage device 24 may also be located at a remote location accessible by a local area network (LAN), a wide area network (WAN), or a public network (e.g., the Internet), not shown. If the storage device 24 is remotely located, some type of encryption and authentication may be used to protect communications of user identification and interface configuration information.

Figure 2:
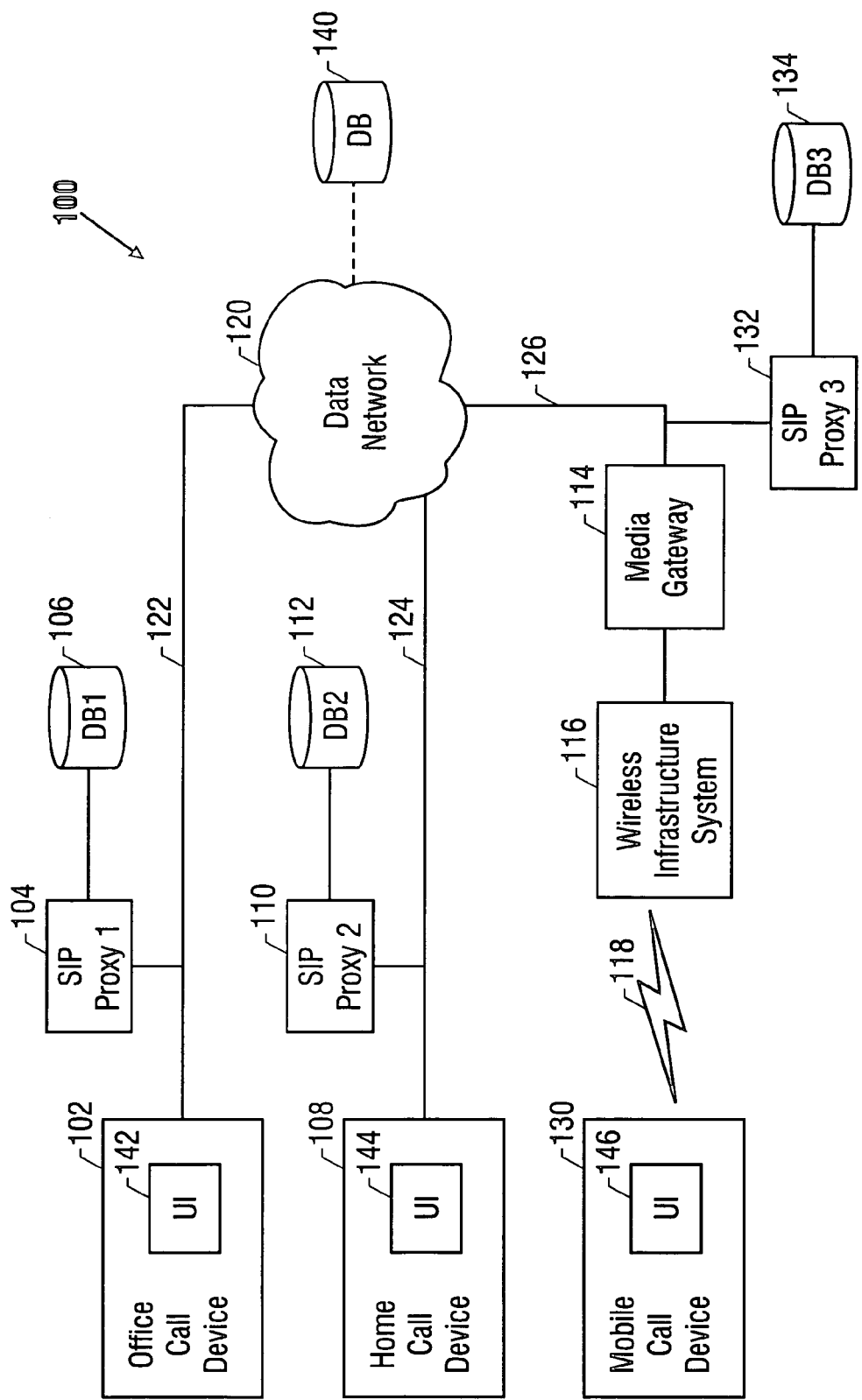
FIG. 2 is a block diagram of another embodiment of a communications system.

Referring to FIG. 2, a communications system 100 according to an arrangement different from that of the communications system 10 in FIG. 1 is shown. The communications system 100 includes a packet-based data network 120 that is coupled to various local networks 122, 124, and 126, which may also be packet-based.

The local network 122 is coupled to an office call device 102 that is capable of participating in SIP communications over the data networks. The local network 122 is also coupled to a first SIP proxy system 104 that has access to a local database 106 containing user configuration information. The next local network 124 may include a call device 108 that is located at home, for example. The local network 124 may also be coupled to a second SIP proxy system 110 that has access to a second database 112 that contains user configuration information. The databases 106 and 112 may contain identical, replicated user information. Thus, each time user configuration information is updated in the database 106 or 112, the update is replicated to other databases coupled through the data network 120. The different databases in the communications system 100 may be according to an Oracle® database product from Oracle Corporation or an SQL Server database product from Microsoft Corporation.

The third local network 126 may be coupled to a media gateway 114, which may be similar to the packet data support node 32 in FIG. 1. The media gateway 114 is coupled to a wireless or cellular infrastructure 116 that is capable of communicating over wireless links 118 to a mobile call device 130. The local network 126 may also be coupled to a third SIP proxy system 132 that has access to a third database 134. Replication may also be performed with the third database 134. The distributed databases (106, 112, and 134) in the communication system 100 may collectively be referred to as a database 140.

Each of the call devices 102, 108 and 130 includes a call control user interface 142, 144, and 146 respectively, that is configurable according to the user using the call device. The process for configuring the user interfaces 142, 144, and 146 is similar to that described in connection with FIG. 1. In general, registration information containing identification information of the user is sent to the corresponding SIP proxy system, which accesses the database to collect the user configuration information. The user configuration information is then sent back to the call device to customize the corresponding user interface. In the wireless infrastructure system 116, control signaling may be added to provide a mechanism to communicate the configuration information. Alternatively, the call control devices may store part or all of the user interface configuration information internally.

Figure 3:
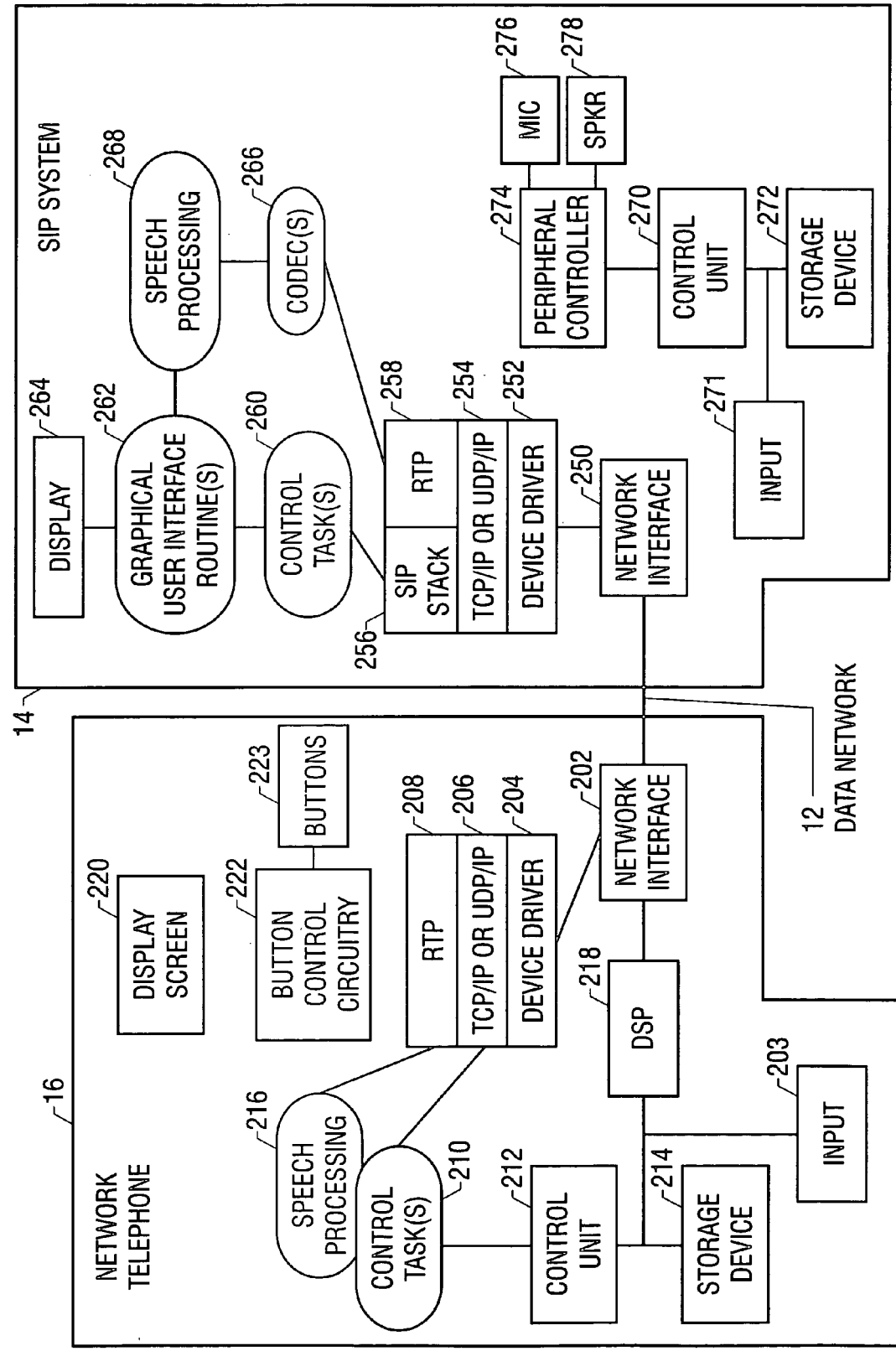
FIG. 3 is a block diagram of components in network elements in the communications system of FIG. 1 or FIG. 2.

Referring to FIG. 3, the components in the network telephone 16 and the SIP system 14 (in FIG. 1) are illustrated in greater detail. The other call devices coupled to the data network 12 (FIG. 1) or data networks 120 (FIG. 2) may include an arrangement of components similar to that of the SIP system 14. As shown in FIG. 3, the network telephone 16 includes a network interface 202 that is coupled to the data network 12. Above the network interface 202 are various software layers, including a device driver layer 204, a TCP/IP or UDP/IP stack 206 and an RTP layer 208. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network. Packets received by the network interface 202 are passed up through the several layers 204, 206 and 208. Control packets are transmitted by the TCP/IP or UDP/IP stack 206 to one or more control tasks 210 in the network telephone 16. The one or more control tasks 210 may be implemented as software routines executable on a control unit 212. Instructions and data associated with the control tasks 210 may be stored in a storage device 214. The control tasks are responsible for generation of control signaling as well as exchanging commands and responses with its associated call control system, which is the SIP system 14.

Voice data may be passed through the RTP layer 208 to a speech processing application 216, which may also be executable on the control unit 212. For faster processing of voice data, a digital signal processor (DSP) 218 may be included in the network telephone 16 to provide data intensive signal processing tasks. For example, the coder/encoder (CODEC) may be implemented in the DSP 218. The network telephone 16 may also include a display screen 220 to display text data (e.g., caller identifier information) associated with a call session. The network telephone also includes various buttons 223 that are connected to button control circuitry 222. The buttons 223 may include numeric buttons, speed dial buttons, a transfer button, a hold button, a re-dial button, and other buttons for performing telephony tasks. Activation of any one of the buttons may cause generation of some type of an indication (such as an interrupt) that is forwarded to the control tasks 210. The display screen 220 and the buttons 223 form the user interface 42 shown in FIG. 1.

The network telephone 16 also includes an input 203 that is coupled to the input device 46 (FIG. 1). The input 203 may include a serial port, a parallel port, a Universal Serial Bus (USB) port, or some other type of input circuit.

The SIP system 14 includes a network interface 250 coupled to the data network 12. Above the network interface 250 are several layers, including a device driver layer 252, a TCP/IP or UDP/IP stack 254, a SIP stack 256, and an RTP layer 258. The SIP stack 256 is responsible for processing or generating SIP requests and responses communicated over the data network 12. The SIP stack 256 is generally a state machine that parses, processes, and generates SIP requests and responses.

The call control tasks 260 are responsible for generating control signaling to establish call sessions over the data network 12 as well as to respond to received call control signaling. In addition, the control tasks 260 are responsible for exchanging commands and responses with the network telephone 16 to establish such call sessions. The SIP system 14 may also include one or more graphical user interface (GUI) routines 262 that control the presentation of information (text or graphical) on a display 264 of the SIP system 14. Further, the user interface provided by the GUI routines 262 may include selectors for call control and indicators of the status of a call session.

In the illustrated arrangement, the RTP layer 258 sends audio data to or receives audio data from a CODEC 266. The CODEC 266 encodes or decodes voice data. A speech processing routine 268 may perform further processing of voice data. In further embodiments, the audio CODEC 266 and the speech processing routine 268 may be omitted.

To provide a voice or audio user interface to a user sitting at the SIP system 14, a peripheral controller 274 is coupled to a microphone 276 and a speaker or headset 278, through which a user can talk or listen during a call session. Graphical user interfaces presented on the display 264, input devices coupled to the SIP system 14, and the microphone 276 and speaker or headset 278 form the user interface 40 (FIG. 1) that is part of the SIP system 14. The SIP system 14 also includes an input 271 that may be coupled to receive user identification information from the input device 46 (FIG. 1).

The various software routines in the SIP system 14 may be executable on a control unit 270. The control unit 270 is coupled to a storage device 272 in which instructions and data associated with the various software routines may be stored.

Figure 4:
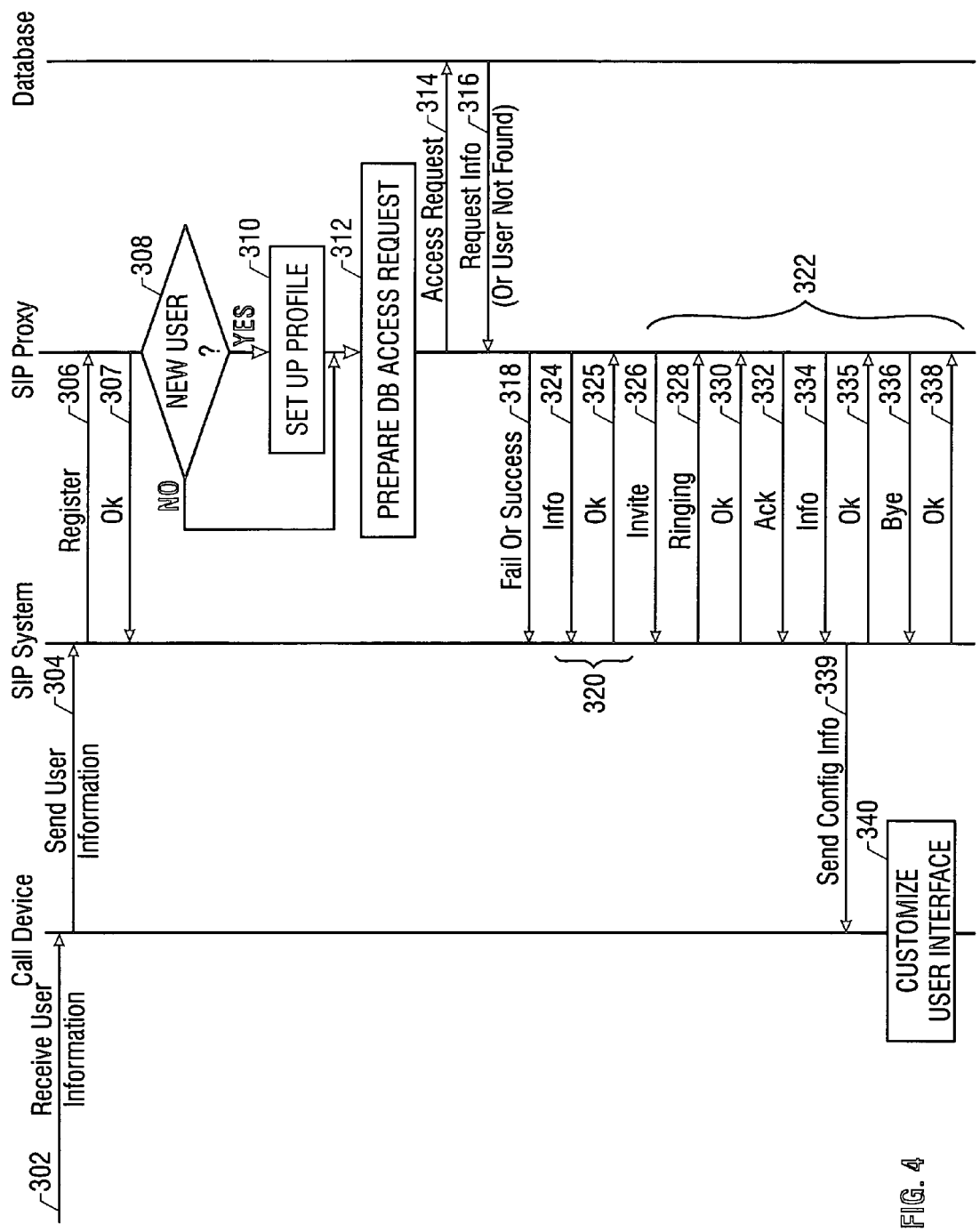
FIG. 4 is a message flow diagram for configuring a call device in accordance with some embodiments.

Referring to FIG. 4, the message flow for configuring a call device in accordance with one embodiment is illustrated. The call device receives (at 302) user identification information. This may be entered through the input device 46 (e.g., a keyboard, a mouse, a biometric device, displays with touch screens, and so forth). In the illustrated example, the call device is the network telephone 16. The call device then sends (at 304) the user identification information to the SIP system 14 that is responsible for controlling the network telephone 16. If the user interface of the SIP system 14 is the one that is to be re-configured, then the exchange of control signaling between the call device and the SIP system would be omitted from the message flow of FIG. 4. In this case, the input device 46 would be connected to the SIP system 14.

The SIP system 14 may send a SIP Register request to its associated SIP proxy system (system 20 in FIG. 1). The SIP Register request may be sent to the well-known "all SIP servers" multicast address "sip.mcast.net" (224.0.1.75), for example. The Register request may include several fields, including a "To:" field that contains the address-of-record whose registration is to be created or updated; a "From:" field that contains the address-of-record of the person responsible for the registration; and a "request URI:" field that names the destination of the registration request. Generally, the domains in the "request URI" and the "To:" fields have the same value; however, it may be possible to register as a visitor while maintaining ones name. For example, a traveler SIP: alice@acme.com (To:) might register under the request URI SIP: atlanta.hiayh.org.

Upon receipt of the Register request, the SIP proxy system 20 returns an OK message (at 307). The SIP proxy system 20 also determines (at 308) if the identified user is a new user. If so, a new profile is set up (at 310). If not a new user, then a database access request is prepared (at 312). An access request is then sent (at 314) to the database 24, which may return with the requested information (at 316) or an indication that the user has not been found. The failure or success is communicated back from the SIP proxy system (at 318) to the SIP system. A success indication may be in the form of a SIP OK response, while a fail indication may be in the form of a SIP Not Found response.

Following a success indication, user configuration information may be communicated from the SIP proxy system 20 to the SIP system 14. One of two example flows may be possible, with a first flow illustrated at 320 and a second flow illustrated at 322. The first flow involves the communication of an out-of-band Info message according to SIP from the SIP proxy 20 to the SIP system 14 (at 324). The Info message may contain the user configuration information. Out-of-band refers to the ability to send informational messages according to SIP outside an established call session. The SIP system 14 may send back an OK response (at 325) after receiving the Info message.

If an out-of-band Info message is not available, then a call session may be established to communicate the user configuration information, as illustrated by the call flow 322. The SIP proxy 20 sends an Invite request (at 326) to the SIP system 14. The Invite request indicates that the receiving node is being invited to participate in a call session. The message body of the Invite request contains a description (e.g., in SDP format) of the session to which the receiving node is being invited.

The SIP system 14 may then send (at 328) a SIP Ringing response back to the SIP proxy 20. The Ringing response indicates that the called user agent has located a possible location where the user has registered recently and is trying to alert the user. The SIP system 14 may then send an OK response (at 330) to indicate that the request has succeeded. The SIP proxy 20 then sends (at 332) an Ack request to the SIP system 14 to confirm that the SIP proxy 20 has received a final response to the Invite request. Upon receipt of an Ack request, a call session is established between the SIP proxy 20 and the SIP system 14. An RTP setup is not needed since voice will not actually be communicated between the SIP proxy 20 and the SIP system 14 in this call session. However, along the signaling path established between the SIP proxy 20 and the SIP system 14, the SIP proxy 20 can send an "in-band" Info message (at 334) to the SIP system 14. The in-band Info message is an informational message that is communicated in the signaling path of an established call session to provide application-level data. In one embodiment, such data in the Info message may contain the user configuration information.

Instead of using the Info message, the SIP proxy 20 may also communicate the configuration information in an OK message, such as an OK message sent in response to the Register message (at 307).

Next, the SIP proxy 20 may send a Bye request (at 336) to the SIP system 14 to terminate the call session. The SIP system 14 responds with an OK response (at 338). Upon receipt of the Info message, the SIP system 14 can communicate the configuration information to the call device, which then customizes the user interface (at 339). The call device then customizes (at 340) its call control user interface.

In another scenario, if the SIP system 14 is the call device being customized, then the customization is performed in the SIP system 14 to customize the user interface 40 of the SIP system 14. A similar process may be performed for customizing user interfaces in other call devices in FIG. 1 or 2.

Figure 5:
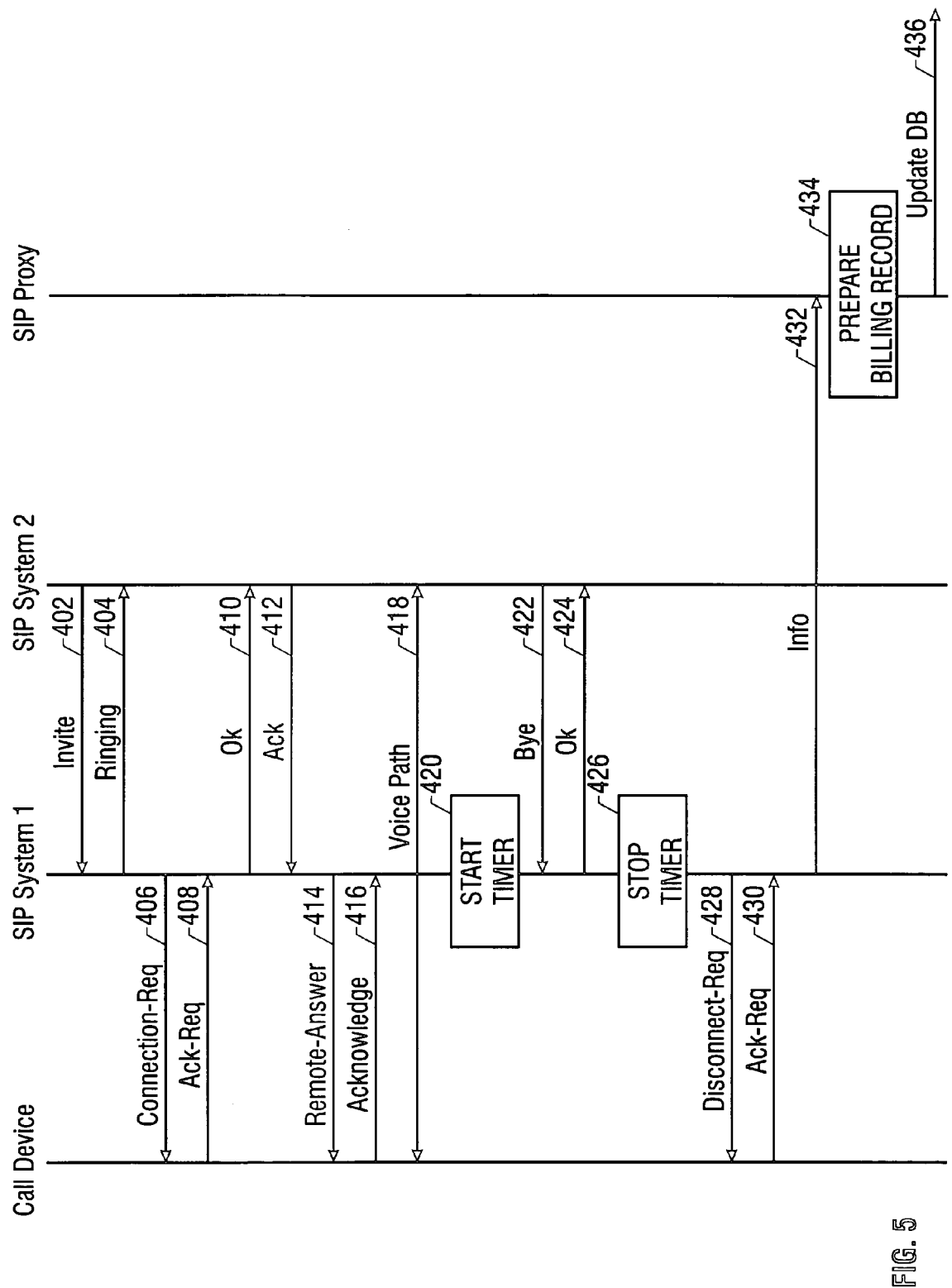
FIG. 5 is a message flow diagram for tracking usage of a call device in accordance with an embodiment.

Referring to FIG. 5, another aspect of some embodiments of the invention is the ability to track the usage of a call device. The call device may be a network telephone or it may be one of the SIP systems (14 and 18) or one of the call devices 102, 108 and 130 (FIG. 2).

As shown in FIG. 5, a second SIP system may send an Invite request (at 402) to a first SIP system to start a call session with the call device, which may be a network telephone connected to the first SIP system. In another example flow where the call device is the first SIP system itself, the exchange of messages between the first SIP system and the network telephone can be omitted. The first SIP system responds to the Invite request with a Ringing response (at 404). The first SIP system may also send a CONNECTION_REQ message (at 406) to the call device, which responds with an ACK_REQ message (at 408) to acknowledge that the call device is available and ready. CONNECTION_REQ is a generic message that indicates a request to establish a connection. The CONNECTION_REQ message may actually include a ring command to activate the ringer of the network telephone and other commands to activate the network telephone, such as activation of the handset, headset, microphone, speaker, and so forth. The ACK_REQ message may be some generic message to acknowledge receipt of the CONNECTION_REQ message. In one example embodiment, the commands and other messages that may be exchanged between the network telephone and an associated control system is described in U.S. patent application Ser. No. 09/307,356, referenced above.

Upon receipt of the ACK_REQ message, the first SIP system sends an OK response (at 410) to the second SIP system. The second SIP system then returns a SIP Ack request (at 412) back to the first SIP system. Upon receipt of the SIP Ack request, the first SIP system 14 sends a REMOTE_ANSWER message (at 414) to the call device, which returns an acknowledge message (at 416). The REMOTE_ANSWER message may be a generic message that includes one or more commands to activate the network telephone 16 for a call session. One such command is a command to open or connect the audio stream to the handset, headset, microphone and speaker of the network telephone. At this point, a voice path is established between the call device and the second SIP system. Upon establishment of the voice path, a timer may be started (at 420). The timer continues to count until termination of the call session.

Either the first or second SIP systems may terminate the call session. In the illustrated example, the second SIP system sends a SIP Bye request (at 422) to the first SIP system, which returns a SIP OK response (at 424). The timer is then stopped (at 426). The first SIP system also sends a DISCONNECT_REQ message to the call device, which returns an ACK_REQ message (at 430). The DISCONNECT_REQ message may be a generic message including one or more commands to deactivate various components of the network telephone. For example, the audio stream may be closed or disconnected, and the handset, headset, microphone and speaker may be deactivated.

The usage information may then be communicated by the first SIP system to a SIP proxy (at 432), such as by use of an out-of-band Info message. Alternatively, if an out-of-band INFO message is not available, then a call session may be established between the first SIP system and the SIP proxy to communicate the usage information, such as by using an in-band Info message. In the SIP proxy system, a billing record may be prepared (at 434). The billing record is then communicated (at 436) to the database coupled to the SIP proxy. The billing records stored in the database may be accessed by service providers later to create bills to subscribers.

Figure 6:
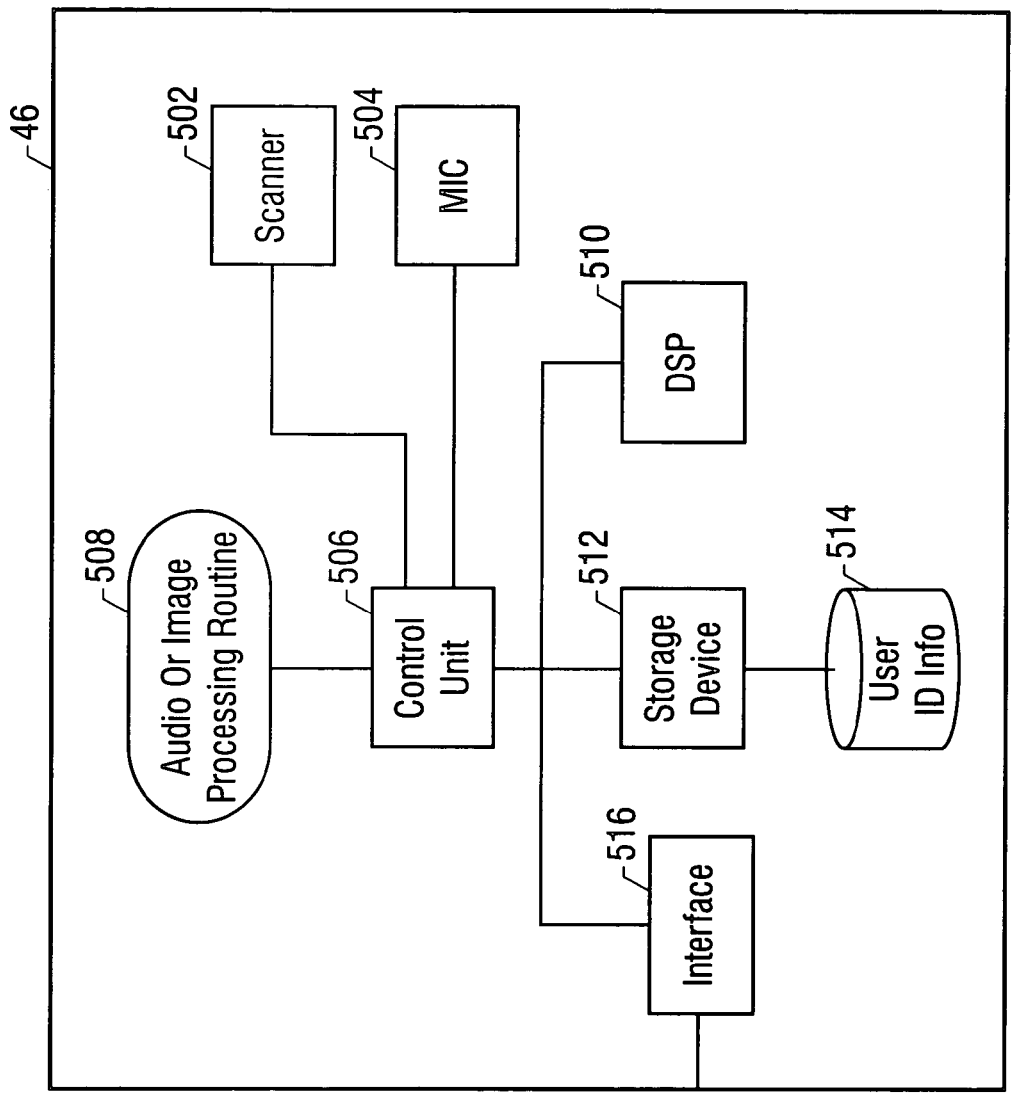
FIG. 6 is a block diagram of a biometric input device in accordance with one embodiment.

Referring to FIG. 6, an example of a biometric input device 46 is illustrated. The biometric input device 46 may include a scanner 502 to scan various physical aspects of a user. For example, such physical aspects may include hand geometry, iris, retina, finger scan, and face geometry. Alternatively, or in addition to the scanner 502, a microphone 504 may be included in the biometric input device 46 to receive the voice of a user. The received biometric information is fed by the scanner 502 or the microphone 504 to a control unit 506. An image or audio processing routine 508 is executable on the control unit 506 to process the received biometric information. A DSP 510 may be part of, or in addition to, the control unit 506 to improve processing speed. A storage device 512 is connected to the control unit 506, and may store a database or file 514 that includes user identification information. The image or audio processing routine 508 matches the biometric information with entries in the user identification information database 514 to identify the user who provided the biometric information. For decreased storage capacity requirements, the database 514 may be a subset of all available user identification information. In that case, the biometric input device 46 may have the capability of accessing a remote database, such as over the data network 12, to access the full database.

Once the image or audio processing routine 508 determines who the user is, the corresponding user identification information is retrieved from the database 514 and communicated to the interface 516. The interface 516 is connected to a corresponding port of a network element, such as the network telephone 16 or the SIP system 14 to communicate the user identification information.

The various software layers, routines, or modules discussed herein may be executable on various control units in the network elements. Each of such control units may include a microprocessor, a microcontroller, a processor card (including one or more microprocessors or microcontrollers) or other control or computing devices. As used here, a "controller" may refer software, hardware, or a combination of both.

Each storage device discussed herein may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines or modules in the various network elements may be stored in respective storage devices. The instructions when executed by a respective control unit (or DSP) cause the corresponding network element to perform programmed acts.

The instructions of the software layers, routines, or modules may be transported to the network element in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. Apparatus for configuring a user interface of a call device capable of communicating over a data network, comprising:
    an interface to receive user identification information;
    a controller adapted to transmit a Session Initiation Protocol (SIP) message including the user identification information over the data network, the SIP message targeted to a system having access to a database containing configuration information; and
    the controller adapted to further receive configuration information associated with the user identification information and to communicate the configuration information to the call device to customize the user interface of the call device, the configuration information to customize call control elements in the user interface that are user-selectable for performing call control.

2. The apparatus of claim 1, wherein the user interface of the call device includes one or more buttons of a telephone customizable by the configuration information.

3. The apparatus of claim 2, wherein the one or more buttons include one or more speed-dial buttons.

4. The apparatus of claim 2, wherein the one or more buttons are customizable to plural configurations.

5. The apparatus of claim 1, wherein the SIP message includes a Register request.

6. The apparatus of claim 1, wherein the controller is adapted to communicate, at different times, plural configuration information associated with plural users to customize the user interface to respective plural configurations.

7. The apparatus of claim 1, wherein the controller is adapted to further communicate control messaging to establish a call session in response to activation of one or more of the telephony control elements.

8. An apparatus for use in a network, comprising:
    a user interface providing one or more selectors for call control in call sessions over the network;

an input to receive identification information of a user from a biometric device; and a controller adapted to provide configuration information after sending a Session Initiation Protocol message, the configuration information corresponding to the user identification information to configure the user interface according to one of plural configurations, wherein the one or more selectors include a selector to dial a telephone number.

9. The apparatus of claim 8, wherein the input is capable of receiving identification information of plural users, the controller to configure the user interface according to a first configuration in response to receipt of identification information of a first user, and the controller to configure the user interface according to a second configuration in response to receipt of identification information of a second user.

10. The apparatus of claim 8, wherein the one or more selectors include a selector to establish a call session with a predetermined party over the network.

11. The apparatus of claim 8, wherein the controller is adapted to send a request including the user identification information to a system on the network, the request comprising the Session Initiation Protocol message.

12. The apparatus of claim 11, wherein the controller is adapted to receive the configuration information from the system.

13. The apparatus of claim 11, wherein the request includes a Session Initiation Protocol Register request.

14. The apparatus of claim 8, wherein the controller is adapted to further communicate control messaging to establish a call session in response to activation of the one or more selectors.

15. The apparatus of claim 8, wherein the controller is adapted to configure the one or more selectors for call control in the user interface according to one of plural configurations.

16. An article including one or more machine-readable storage media containing instructions for configuring a call control user interface, the instructions when executed causing a system to:

send a registration request containing identification information of a first user over a data network to a remote system containing configuration information associated with plural users;

receive configuration information associated with the first user responsive to the registration request from the remote system;

communicate the configuration information to an element to customize the call control user interface; and communicate call control messaging to establish a call session, wherein the registration request includes a Session Initiation Protocol Register request.

17. The article of claim 16, wherein the one or more storage media contain instructions that when executed cause the system to send a registration request containing identification information of a second user.

18. The article of claim 16, wherein the one or more storage media contain instructions that when executed cause the system to receive configuration information associated with the second user and to communicate the second user configuration information to the element to customize the call control user interface a different way.

19. The article of claim 18, wherein the one or more storage media contain instructions that when executed cause the system to customize a set of one or more buttons of a telephone call control user interface.

20. The article of claim 16, the configuration information to customize call control elements of the call control user interface for performing call control.

21. The article of claim 16, wherein communicating the configuration information to customize the call control user interface comprises communicating the configuration information to customize telephone buttons of a telephone.

22. A call device for use in a communications system comprising:

a user interface including one or more telephony control selectors; and a controller adapted to identify a user of the call device and to send a Session Initiation Protocol (SIP) request for configuration information, the controller adapted to further customize the telephony control selectors of the user interface in one of plural configurations based on the configuration information.

23. The call device of claim 22, wherein the controller is adapted to customize the user interface in a first configuration based on configuration information of a first user, and to customize the user interface in a second configuration based on configuration information of a second user.

24. The call device of claim 23, wherein the user interface comprises at least one of:

one or more buttons of a telephone; and a visual user interface of the call device.

25. The call device of claim 22, wherein the controller is adapted to customize the one or more telephony control selectors in the user interface in one of the plural configurations based on the configuration information.

26. A data signal embodied in a carrier wave and comprising one or more code segments including instructions for configuring a user interface of a call device, the instructions when executed causing the call device to:

identify a user of the call device;

send a Session Initiation Protocol (SIP) request for configuration information based on the identified user;

receive the configuration information in response to the SIP request; and customize call control elements of the user interface of the call device based on the configuration information for performing call control, wherein the one or more code segments include instructions that when executed cause the call device to customize one or more call control buttons of a telephone.

27. The data signal of claim 26, wherein the one or more code segments include instructions that when executed cause the call device to further receive identification information of the user.

28. The data signal of claim 27, wherein the one or more code segments include instructions that when executed cause the call device to receive the identification information from a biometric device.

29. The data signal of claim 26, wherein the instructions when executed cause the call device to communicate call control messaging to establish a call session in response to activation of one or more of the call control elements.

30. A method of configuring a user interface of a call device, comprising:

receiving identification information of a user;

sending registration information including the identification information in a Session Initiation Protocol (SIP) message to a system having access to a database of user configuration information;

receiving configuration information associated with the identification information; and communicating the configuration information to the call device for customizing user-selectable telephony control elements for telephony control in the call device user interface.

31. The method of claim 30, wherein communicating the configuration information to the call device includes communicating to a telephone, the user interface of the telephone including a set of one or more buttons configurable to one of plural configurations based on the configuration information.

32. The method of claim 30, wherein communicating the configuration information to the call device includes communicating to a graphical user interface routine, the graphical user interface routine capable of adjusting a graphical user interface to plural configurations based on the configuration information.

33. The method of claim 32, wherein communicating the configuration information to the call device includes communicating to a computer having voice processing elements.

34. The method of claim 32, wherein the call device includes a computer, and wherein the acts of receiving the user identification information, sending the registration information, receiving the configuration information, and communicating the configuration information are performed in the computer.

35. The method of claim 30, wherein the configuration information enables customization of one or more buttons of a telephone.

36. The method of claim 30, wherein customizing the user interface of the call device comprises customizing, at different times, the user interface of the call device to plural different configurations in response to receiving configuration information corresponding to plural users.

37. The method of claim 30, wherein customizing the user interface comprises at least one of:

configuring one or more buttons of a telephone; and configuring a visual user interface of the call device.

38. The method of claim 30, further comprising communicating messaging to establish a call session in response to activation of one or more of the user-selectable call control elements.

* * * * *